(12) United States Patent
Turner et al.

(10) Patent No.: US 10,272,987 B2
(45) Date of Patent: *Apr. 30, 2019

(54) AUTONOMOUS SLAT-COVE-FILLER DEVICE FOR REDUCTION OF AEROACOUSTIC NOISE ASSOCIATED WITH AIRCRAFT SYSTEMS

(71) Applicant: The United States of America as represented by the Administrator of the National Aeronautics and Space Administration, Washington, DC (US)

(72) Inventors: Travis L. Turner, Yorktown, VA (US); Reggie T. Kidd, Hampton, VA (US); David P Lockard, Hampton, VA (US); Mehdi R. Khorrami, Norfolk, VA (US); Craig L. Streett, Virginia Beach, VA (US); Douglas Leo Weber, Hayes, VA (US)

(73) Assignee: THE UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 462 days.

This patent is subject to a terminal disclaimer.

(21) Appl. No.: 15/005,338

(22) Filed: Jan. 25, 2016

(65) Prior Publication Data

US 2016/0137284 A1    May 19, 2016

Related U.S. Application Data

(63) Continuation of application No. 13/277,859, filed on Oct. 20, 2011, now Pat. No. 9,242,720.

(Continued)

(51) Int. Cl.
*B64C 3/48* (2006.01)
*B64C 9/22* (2006.01)
*B64C 9/24* (2006.01)

(52) U.S. Cl.
CPC .............. *B64C 3/48* (2013.01); *B64C 9/22* (2013.01); *B64C 9/24* (2013.01); *B64C 2230/14* (2013.01); *Y02T 50/14* (2013.01); *Y02T 50/32* (2013.01)

(58) Field of Classification Search
CPC .... B64C 9/24; B64C 2230/06; B64C 2230/14
(Continued)

(56) References Cited

U.S. PATENT DOCUMENTS 2,418,273 A    4/1947 Moore
4,614,320 A    9/1986 Rutan
(Continued)

OTHER PUBLICATIONS

Singer, B. A. et al., "Computational Aeroacoustic Analysis of Slat Trailing-Edge Flow," AIAA, Sep. 2000, pp. 1558-1564, vol. 38, No. 9.

(Continued)

Primary Examiner — Marc Burgess
(74) Attorney, Agent, or Firm — Andrea Z. Warmbier; Robin W. Edwards; Mark P. Dvorscak (57) ABSTRACT

A slat cove filler is utilized to reduce airframe noise resulting from deployment of a leading edge slat of an aircraft wing. The slat cove filler is preferably made of a super elastic shape memory alloy, and the slat cove filler shifts between stowed and deployed shapes as the slat is deployed. The slat cove filler may be configured such that a separate powered actuator is not required to change the shape of the slat cove filler from its deployed shape to its stowed shape and vice-versa. The outer contour of the slat cove filler preferably follows a profile designed to maintain accelerating flow (Continued)

in the gap between the slat cove filler and wing leading edge to provide for noise reduction.

18 Claims, 8 Drawing Sheets

Related U.S. Application Data (60) Provisional application No. 61/405,347, filed on Oct. 21, 2010.

(58) Field of Classification Search
USPC .................. 244/1 N, 214, 203, 215, 99.8
See application file for complete search history.

(56) References Cited

U.S. PATENT DOCUMENTS

| | | | |
|---|---|---|---|
| 6,394,396 B2 | 5/2002 | Gleine et al. | |
| 6,789,769 B2 | 9/2004 | Mau et al. | |
| 6,813,877 B2* | 11/2004 | Birch | F02K 1/383 |
| | | | 415/211.2 |
| 7,550,189 B1* | 6/2009 | McKnight | B32B 3/10 |
| | | | 244/99.8 |
| 7,735,601 B1* | 6/2010 | Stieger | B64D 33/06 |
| | | | 244/1 N |
| 7,766,281 B2 | 8/2010 | Lorkowski et al. | |
| 8,100,358 B2 | 1/2012 | Fol et al. | |
| 8,424,810 B1 | 4/2013 | Shmilovich et al. | |
| 8,534,610 B1 | 9/2013 | Pitt et al. | |
| 8,596,585 B2 | 12/2013 | Havar et al. | |
| 8,834,116 B2 | 9/2014 | Guemmer | |
| 8,938,972 B2 | 1/2015 | Stark et al. | |
| 2008/0251647 A1 | 10/2008 | Lorkowski et al. | |
| 2008/0272232 A1* | 11/2008 | Cagle | F02K 1/386 |
| | | | 244/99.8 |
| 2010/0084508 A1 | 4/2010 | Hirai et al. | |
| 2010/0288888 A1* | 11/2010 | Coconnier | B64C 7/00 |
| | | | 244/214 |
| 2012/0061523 A1 | 3/2012 | Havar et al. | |
| 2012/0261517 A1* | 10/2012 | Turner | B64C 7/00 |
| | | | 244/203 |

OTHER PUBLICATIONS

Khorrami, M. R. et al., "Time-accurate Simulations and Acoustic Analysis of Slat Free Shear Layer," AIAA, Jul. 2002, pp. 1284-1291, vol. 40, No. 7.

Khorrami, M. R. et al., "Time-accurate Simulations and Acoustic Analysis of Slat Free Shear Layer: Part II," 8th AIAA/CEAS Aeroacoustic Conference and Exhibit, Jun. 17-19, 2002, pp. 1-11, Breckenridge, Colorado.

Choudhari, M. et al., "Slate Cove Noise Modeling: A Posteriori Analysis of Unsteady RANS Simulations," 8th AIAA/CEAS Aeroacoustic Conference and Exhibit, Jun. 17-19, 2002, pp. 1-14, Breckenridge, Colorado.

Streett C. L. et al., "Aerodynamic Noise Reduction for High-Lift Devices on a Swept Wing Model," 44th AIAA Aerospace Sciences Meeting and Exhibit, Jan. 9-12, 2006, pp. 1-26, Reno, Nevada.

Imamura, Taro et al., "Designing of Slat Cove Filler as a Noise Reduction Device for Leading-edge Slat," 13th AIAA/CEAS Aeroacoustics Conference, (28th AIAA Aeroacoustics Conference), 2007, pp. 1-17.

Otsuka, K. et al., "Shape Memory Materials," Cambridge university Press, 1998, pp. 27-30, Cambridge, UK.

Lagoudas, D. C., "Shape Memory Alloys: Modeling and Engineering Applications," Springer Science+Business Media, LLC, 2008, p. 10, New York, NY.

Imamura, Taro et al., "A Far-field Noise and Near-field Unsteadiness of a Simplified High-lifted-configuration Model (Slat)," 47th AIAA Aerospace Sciences Meeting Including the New Horizons Forum and Aerospace Exposition, Jan. 5-8, 2009, Orlando, Florida.

Khorrami, M.R. et al., "Unsteady flow computations of a slat with a blunt trailing edge," AIAA Journal, Nov. 2000, pp. 2050-2058, vol. 38, No. 11.

Imamura, Taro, et al., "Numerical and Experimental Research of Low-Noise Slat using Simplified High-Lift Model," 14th AIAA/CEAS Aeroacoustics Conference (29th AIAA Aeroacoustics Conference), May 5-7, 2008, Vancouver, British Columbia, Canada.

Hicks, Raymond, M., "Wing design by numerical optimization," Journal of Aircraft (1978), pp. 407-412, 15(7).

Jameson, Antony, "Multi-point Aero-Structural Optimization of Wings Including Planform Variations," 45th AIAA Aerospace Sciences Meeting and Exhibit (2007), pp. 1-13.

\* cited by examiner

AUTONOMOUS SLAT-COVE-FILLER DEVICE FOR REDUCTION OF AEROACOUSTIC NOISE ASSOCIATED WITH AIRCRAFT SYSTEMS

CROSS-REFERENCE TO RELATED APPLICATION

This application is a continuation of U.S. patent application Ser. No. 13/277,859, filed Oct. 20, 2011, U.S. Pat. No. 9,242,720, which claims the benefit of and priority to U.S. Provisional Patent Application No. 61/405,347, filed on Oct. 21, 2010. The contents of each of the foregoing applications are hereby incorporated by reference in their entireties.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

This invention relates to aircraft wings, and in particular to a slat cove filler utilized in conjunction with a leading edge slat of an aircraft wing to reduce aero-acoustic noise associated with the slat when it is in a deployed configuration.

BACKGROUND OF THE INVENTION

Airframe noise produced by unsteady air flow around aircraft structures is a significant source of aircraft noise during landing approach. Conventional leading-edge slat devices for high-lift are a prominent source of airframe noise. Various devices have been developed in an attempt to reduce the noise associated with leading-edge slats.

SUMMARY OF THE INVENTION

One aspect of the present invention is a wing structure for aircraft having reduced airframe noise. The wing structure includes a primary wing having a leading edge, a trailing edge, and upper and lower surfaces extending between the leading and trailing edges to define a first airfoil element. The wing structure also includes a leading-edge slat that is movably interconnected with the primary wing for movement between a retracted position wherein the leading edge slat is positioned directly adjacent to the leading edge of the primary wing structure, and a deployed position wherein the leading-edge slat is shifted forward and/or rotated downwardly relative to the retracted position to define a multi-element airfoil. The leading-edge slat includes a leading surface at which airflow splits and flows over an upper surface of the leading-edge slat that extends rearwardly from the leading surface to a trailing edge, and a lower surface extending rearwardly from the leading surface to a cusp. The wing structure further includes a slat cove filler comprising a thin flexible material connected to the trailing edge and the cusp. The slat cove filler defines a first shape when the leading edge slat is in its deployed position. The slat cove filler further defines a second shape when the leading edge slat is in its retracted position. At least a portion of the slat cove filler comprises a highly elastic material such as a superelastic shape memory alloy. If the slat cove filler is made of a superelastic shape memory alloy, the alloy transforms from an austenitic phase to a martensite phase when the slat cove filler changes from the first shape to the second shape. At least a portion of the superelastic shape memory alloy transforms from a martensite phase to an austenitic phase when the slat cove filler changes from the second shape to the first shape. The superelastic shape memory alloy accommodates large strains on the order of two percent that may be encountered as the slat cove filler changes between the first and second shapes.

A portion of the slat cove filler may be configured to contact the primary wing structure as the leading-edge slat moves from the deployed position to the retracted position. Contact of the slat cove filler with the primary wing structure causes the slat cove filler to change from the first shape to the second shape. The slat cove filler may be biased to change from the second shape to the first shape. The bias causes the slat cove filler to change from the second shape to the first shape as the leading edge slat is moved from the retracted position to the deployed position. The bias may be due to deformation of the material forming the slat cove filler and/or a separate spring. An edge of the slat cover filler may be rotatably connected to the cusp of the leading-edge slat by a hinge, and a torsion spring acting about the hinge may be utilized to bias the slat cove filler into the second shape. Thus, the slat cove filler may be capable of changing shapes between the first and second shapes without use of a powered actuator acting directly on the slat cove filler.

These and other features, advantages, and objects of the present invention will be further understood and appreciated by those skilled in the art by reference to the following specification, claims, and appended drawings.

DETAILED DESCRIPTION OF THE INVENTION

Figures 2, 3:
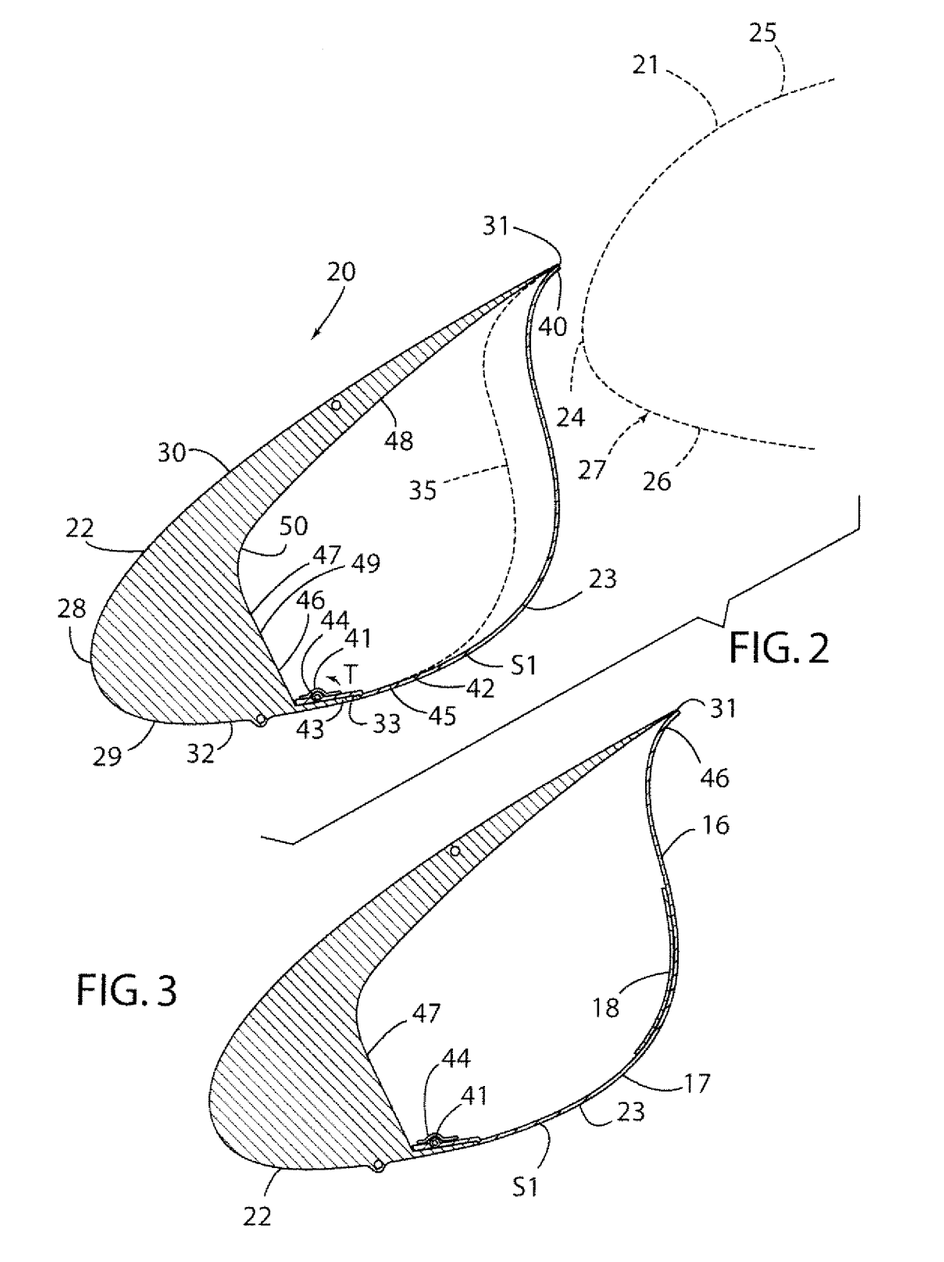
FIG. 2 is a cross-sectional view of a slat and slat cove filler according to one aspect of the present invention.
FIG. 3 is a cross-sectional view of a slat and slat cove filler according to another aspect of the present invention.

For purposes of description herein, the terms "upper," "lower," "right," "left," "rear," "front," "vertical," "horizontal," and derivatives thereof shall be related to the invention as oriented in FIG. 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Furthermore, references to specific items or features (e.g. a wing structure, leading edge slat, and slat cove filler) shall not be construed as limiting the item or feature to one-piece or multi-piece items or features. Hence, specific dimensions and other physical characteristics relating to the embodiments disclosed herein are not to be considered as limiting, unless the claims expressly state otherwise.

Figure 1:
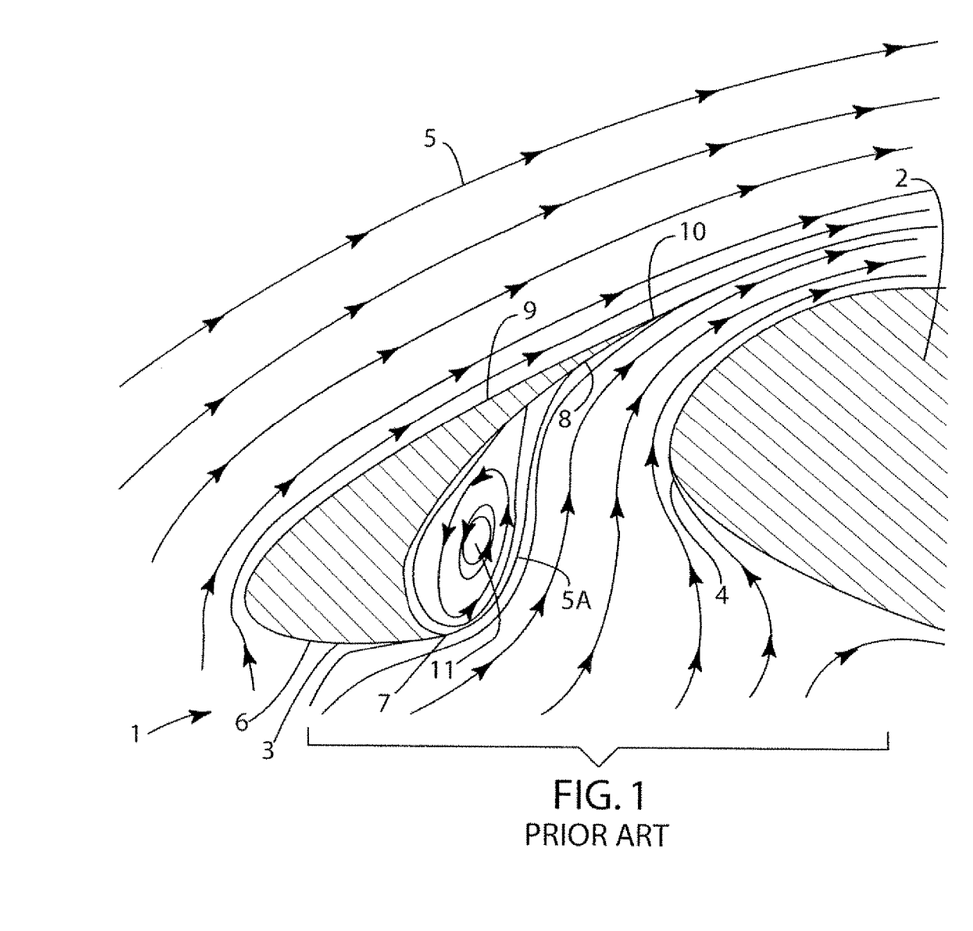
FIG. 1 is partially fragmentary schematic view showing flow streamlines in the slat region of a conventional airfoil.

With reference to FIG. 1, a conventional wing assembly 1 includes a primary wing structure 2, and a leading edge slat 3 positioned adjacent a leading edge 4 of primary wing structure 2. The leading edge slat 3 and primary wing structure 2 result in a plurality of streamlines 5 during operation. In general, the flow splits at a stagnation point 6 on the leading surface of slat 3, and flow progressing on the lower side of the slat 3 separates at the cusp 7, and the resulting shear layer reattaches at the lower surface 8 of upper part 9 of slat 3, forward of the trailing edge 10 of slat 3. Vortical re-circulating flow develops in cove region 11 of slat 3, forward of the shear layer. The separated shear layer at the cusp 7 produces large-scale flow structures that support the unsteady fluctuating flow field. Interaction of the large scale flow structures accelerating through the gap with the vortical re-circulation, fluctuations in the reattachment of the shear layer in the slat cove and flow energy conversion as the reattached shear layer separates from the trailing edge are known sources of airframe noise.

With further reference to FIG. 2, an aircraft wing structure 20 according to one aspect of the present invention includes a primary wing structure 21, a leading edge slat 22, and a slat cove filler 23. Primary wing structure 21 may comprise a known aircraft wing having a leading edge portion 24, a trailing edge (not shown), an upper surface 25, and a lower surface 26. The upper and lower surfaces 25 and 26 extend between the leading and trailing edges to define a first airfoil element 27. The slat 22 may be movably interconnected with primary wing structure 21 by various known mechanisms. Such mechanisms shift/rotate the leading edge slat downwardly and/or forwardly when the slat is moved to the deployed position. Also, leading edge slat 22 may be movably interconnected with the primary wing structure 21 by the mechanism described in more detail below in connection with FIG. 12. The leading edge slat 22 is movable between a retracted position (FIG. 9) wherein the leading edge slat 22 is positioned directly adjacent leading edge 24 of primary wing structure 21 to define a cavity or volume 36, and a deployed position (FIG. 4) wherein the leading edge slat 22 is shifted/rotated downwardly relative to the retracted position to thereby provide a multi-element airfoil. Leading-edge slat 22 includes a leading surface 28 defining a stagnation point 29 at which airflow splits and flows over an upper surface 30 of the leading-edge slat 22 that extends rearwardly from leading surface 28 to a trailing edge 31, and a lower surface 32 extending rearwardly from the leading surface 28 to a cusp 33.

Figure 4:
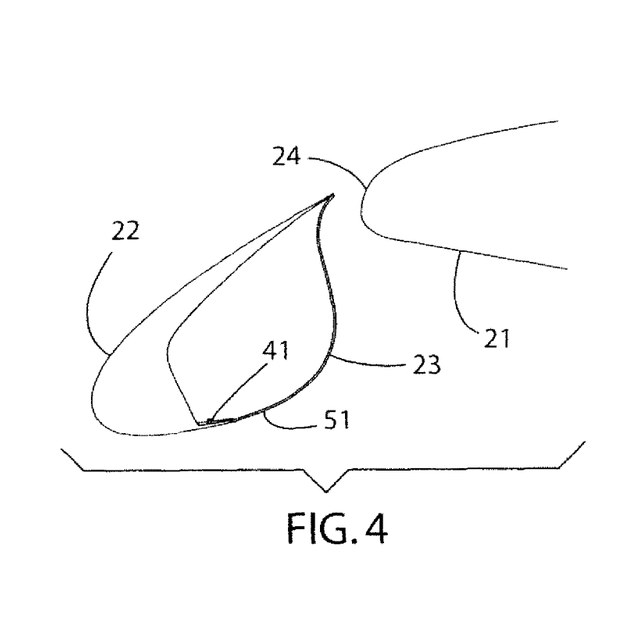
FIG. 4 is a partially fragmentary cross-sectional view of a wing structure leading edge slat, and a slat cove filler, wherein the leading edge slat is in a deployed configuration.
Figure 5:
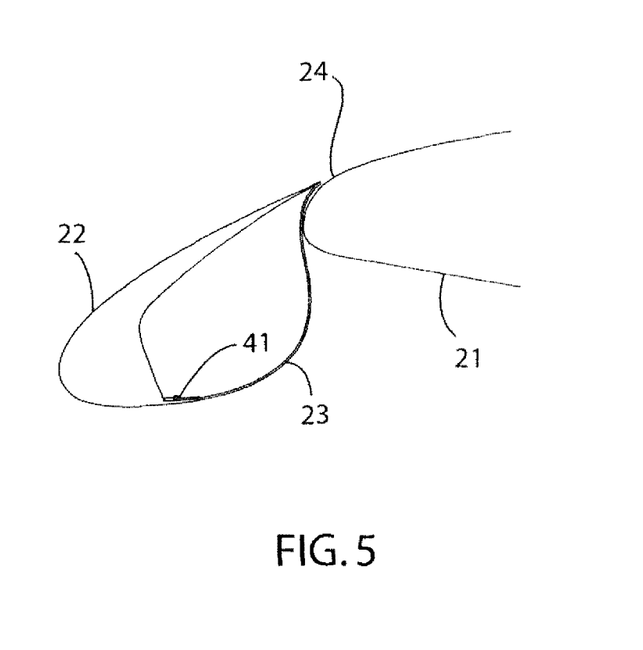
FIG. 5 is a partially fragmentary cross-sectional view of a wing structure leading edge slat, and a slat cove filler, wherein the leading edge slat is in a configuration that is between a deployed configuration and a stowed configuration.

A slat cove filler 23 according to one aspect of the present invention comprises a sheet of thin flexible material connected to trailing edge 31 and cusp 33 of leading-edge slat 22. It will be understood that slat cove filler may comprise an elongated element extending along substantially the entire span-wise length of slat 22, or it may extend along only a portion or portions of slat 22. The slat cove filler 23 defines a first shape S1 (FIGS. 2 and 4) when leading edge slat 22 is in a deployed position, and a second shape "S2" (FIG. 9) that allows slat cove filler to fit into cavity or volume 36 between wing 21 and slat 22 when the leading edge slat is in its retracted position. As discussed in more detail below, at least a portion of the slat cove filler 23 may comprise a superelastic shape memory alloy that transforms from an austenitic phase to a martensite phase when the slat cove filler 23 changes from the first shape S1 (FIG. 4) to the second shape S2 (FIG. 9) due to the large deformation required of the slat cove filler to assume. The superelastic shape memory alloy preferably changes or transforms from a martensite phase back to an austenitic phase when the slat cove filler 23 changes from the second shape S2 (FIG. 9) to the first shape S1 (FIGS. 2 and 4).

Alternately, slat cove filler 23 may comprise areas or segments 18 that are thicker as discussed below in connection with FIG. 3. As discussed in more detail below, if slat cove filler 23 comprises superelastic shape memory alloy (metal), it may need to include thinner areas for increased flexibility to form a shape S2 that fits between slat 22 and wing 21 when slat 22 is in the retracted position.

Referring again to FIG. 2, a known slat cove filler profile 35 is based on a flow streamline whereby the contour 35 closely follows a selected flow streamline such as the flow streamline 5A (FIG. 1) that may be associated with the characteristic shape of the separated shear layer. However, as discussed in more detail below in connection with FIGS. 10 and 11, a slat cove filler 23 according to the present invention preferably includes a profile or surface shape that is designed to eliminate flow deceleration between slat 22 and primary wing structure 21, thus maintaining an attached boundary layer on the filler surface. In general, a streamline-based slat cove filler following contour line 35 is significantly shorter than slat cove filler 23 based on the "attached-flow" design philosophy, but suffers from degraded aerodynamic and noise-reduction performance.

In addition to aerodynamic considerations, slat filler 23 must also fit into cavity 36 when slat 22 is retracted. A shorter slat cove filler based on a flow streamline 35 may stow in cavity 36 (FIG. 9) between slat 22 and primary wing structure 21 without plastic deformation if the slat cove filler is constructed from a conventional material such as aluminum alloy. However, a slat cove filler 23 based on an attached-flow configuration must, in general, sustain large deformation in order to stow into the cavity or volume 36 between slat 22 and primary wing structure 21. Because slat 22 and wing 21 may comprise existing aircraft wings of different designs, the shape and size of cavity 36 may vary. The deformation required for an attached-flow slat cove filler 23 as shown in FIG. 2 is generally in the range of 1-3%, which exceeds the capability of conventional materials such as aluminum alloys. However, superelastic shape memory alloys are capable of such large deformations.

Known superelastic shape memory alloys may exhibit a phase transformation between a high-temperature (typically cubic) microstructure called austenite at a lower-temperature (typically monoclinic, orthorhombic or tetragonal) microstructure called martensite in response to changes in temperature and applied stress. One material behavior utilized in the present invention is superelasticity, where the material is in the austenitic (high-temperature) phase under all operating conditions and is transformed to martensite by applied stress.

Superelastic shape memory alloy material behaves like a conventional, linear-elastic material with increasing stress until a critical stress is reached. In general, the critical stress depends on the alloy chemistry and temperature. At the critical stress level, the microstructure begins transforming to martensite, and accommodates large deformation (transformation strain), up to about 7% without permanent deformation by reorientation (detwinning) of the martensitic microstructure to variants that are consistent with the applied stress. The constituative behavior reverts to linear-elastic response of detwinned martensite once transformation of the microstructure is complete. Removal of the applied stress is accompanied by recovery of elastic deformation in the detwinned martensite phase followed by the reverse transformation to austenite at a second critical stress that is characteristically lower than that for transforming austenite to martensite. Continued reduction of the applied stress results in completion of the reverse transformation to austenite and complete recovery of all deformation, thereby returning the structure to its original configuration upon removal of all stress.

The "stress-free" shape of the superelastic shape memory alloy slat cove filler 23 is that of the deployed configuration (FIGS. 2 and 4). The upper edge of slat cove filler 23 forms a rigid lap joint 40 with the slat 22 at the trailing edge 31 of the slat. The lower edge of superelastic slat cove filler 23 is mounted to the cusp 33 of slat 22 by a hinge 41. It will be understood that lap joint 40 and hinge 41 may extend along the entire span0-wise length of slat 22, or a portion or portions thereof. The hinge joint 41 is configured such that the outer surface/outer mold line 42 of slat cove filler 23 is flush with the outer surface/outer mold line 43 of the slat 22 at the cusp 33.

Figure 9:
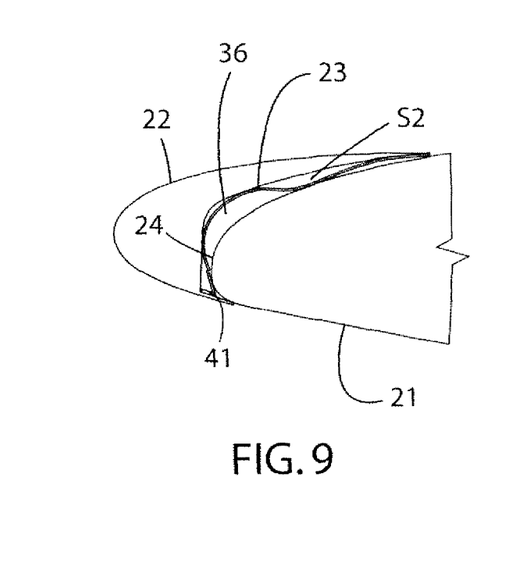
FIG. 9 is a partially fragmentary cross-sectional view of a wing structure leading edge slat, and a slat cove filler, wherein the leading edge slat is in a retracted or stowed configuration.

The forces developed between the slat cove filler 23 and the main wing element or structure 21 during retraction to the configuration of FIG. 9 is used to generate the stress required to transform the microstructure in the superelastic shape memory alloy material of the slat cove filler 23. The force required for stowage can be minimized by appropriate choice of alloy chemistry and processing, and the large deformation requirement is accommodated by the transformation-strain characteristics of the superelastic shape memory alloy. Friction between the slat cove filler 23 and the main wing structure or element 21 can be minimized by utilizing known low-friction coating materials (not shown) on the outer surface of slat cove filler 23.

A conventional torsion spring 44 or the like may be utilized to generate a torque "T" acting on slat cove filler 23 at hinge 41. The torque T tends to restore the slat cove filler 23 to the configuration shown in FIGS. 2 and 4. The deformation of slat cove filler 23 when in the retracted configuration (FIG. 9) also generates a force tending to cause the slat cove filler 23 to shift to the position of FIG. 4. Contact between slat cove filler 23 and primary wing structure 21 causes the slat cove filler 23 to shift to the configuration of FIG. 9 as the slat 22 is stowed, and the slat cove filler 23 may be configured to automatically shift outwardly to the configuration of FIGS. 2 and 4 as the slat 22 is moved to the deployed position of FIG. 4. The hinge 41 permits the edge portion 45 of slat cove filler 23 to fit closely against inner surface 46 of slat 22 when the slat 22 is in the stowed configuration of FIG. 9. The inner surface 47 of slat 22 includes a downwardly facing portion 48 that joins with upper surface 30 of slat 22 at trailing edge 31. Inner surface 47 of slat 22 also includes a generally vertical portion 49 and a radiused portion 50 that extends between downwardly-facing surface 48 and vertical portion 49 of inner surface 47. Wing 21 and slat 22 may comprise existing components of an aircraft wing, and the contour of inner surface 47 may therefore be somewhat different than the configuration shown in FIG. 2 depending upon the type of aircraft to which the slat cove filler 23 is fitted.

Figure 6:
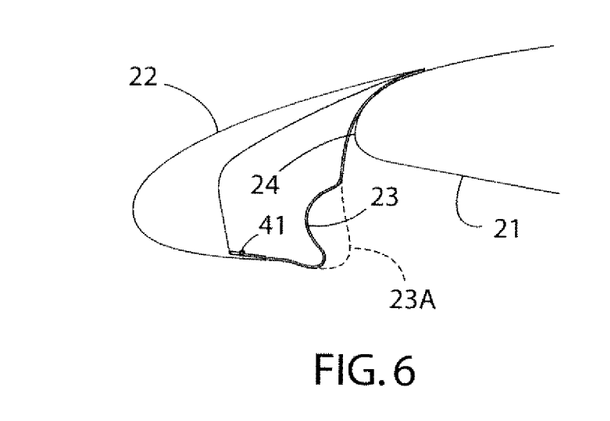
FIG. 6 is a partially fragmentary cross-sectional view of a wing structure leading edge slat, and a slat cove filler, wherein the leading edge slat is in a configuration that is intermediate between a deployed and stowed configuration.
Figure 7:
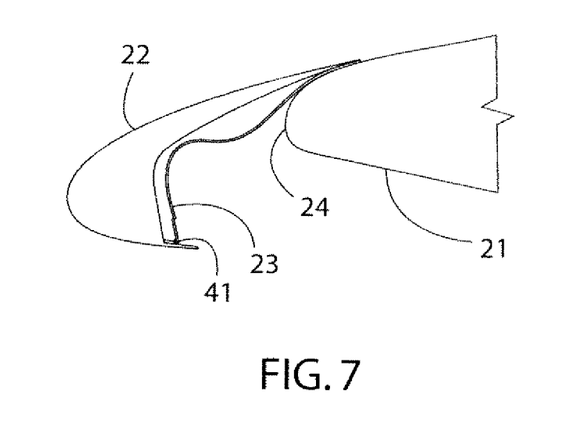
FIG. 7 is a partially fragmentary cross-sectional view of a wing structure leading edge slat, and a slat cove filler, wherein the leading edge slat is in a configuration that is intermediate between a deployed and stowed configuration.
Figure 8:
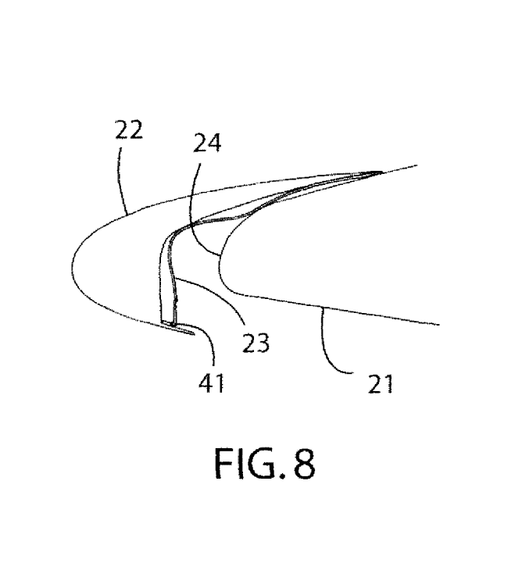
FIG. 8 is a partially fragmentary cross-sectional view of a wing structure leading edge slat, and a slat cove filler, wherein the leading edge slat is in a configuration that is intermediate between a deployed and stowed configuration.

With reference to FIGS. 4-9, as the slat 22 moves from the deployed configuration (FIG. 4) to the retracted position (FIG. 9), the slat cove filler 23 is deformed due to contact between the slat cove filler 23 and leading edge 24 of primary wing structure 21. The slat cove filler 23 may be configured to "snap" from a partially retracted (stowed) configuration (FIG. 6) to a more fully or completely retracted configuration (FIGS. 7 and 9) as the slat cove filler 23 passes through an intermediate configuration. The shape of the solid line 23 of FIG. 6 is characteristic of a multi-piece or variable thickness slat cove filler 23, and the dashed line 23A is characteristic of a single-piece or uniformly-thick configuration of slat cove filler 23. The stiffness and thickness of slat cove filler 23 is selected to ensure that slat cove filler 23 fits closely between primary wing 21 and slat 22 in cavity 36 as shown in FIG. 9. Slat cove filler 23 may be made from a sheet of superelastic shape memory alloy material that is approximately 0.040" thick. In a preferred embodiment, the material has a generally uniform thickness in the range of about 0.030" to about 0.050". However, different regions of slat cove filler 23 may have varying thicknesses to provide for the required deformation to fit within cavity 36 (FIG. 9) between slat 22 and primary wing structure 21, depending upon the shape of cavity 36.

With further reference to FIG. 3, the slat cove filler 23 may include one or more segments 18 that are thicker than adjacent portions 16 and 17 of slat cove filler 23. Segment 18 may comprise the same material (e.g. superelastic shape memory alloy) as the adjacent portions 16 and 17 of slat cove filler 23, and it may be integrally formed with adjacent portions 16 and 17. Alternately, segment 18 may comprise a different material, or it may comprise a different piece that is secured to a sheet of the same material. The thicker segment or portion 18 may be significantly stiffer than adjacent portions 16 and 17. During the design of slat cove filler 23, the increased stiffness of the thicker segment 18 may be utilized to cause slat cove filler 23 to fit closely against inner surface 47 of a slat 22 if the surface contour 47 so requires. One or more thicker segments 18 may be utilized to provide the desired stowed configuration of slat cove filler 23 such that the slat cove filler 23 fits within the cavity 36 (FIG. 9) formed between slat 22 and primary wing structure 21 when slat 22 is in the stowed configuration. Thicker segment 18 may comprise one or more elongated strips that extend along slat cove filler 23 parallel to slat 22 and leading edge 24 of wing 21. Controlling the thickness of segments of slat cove filler 23 may also be utilized to control deformation of slat cove filler 23 as it "snaps" between shapes S1 and S2. This may include controlling both the shape and sequence of deformation as the slat cove filler changes from shape S1 to shape S2 and vice-versa. Controlling the shape of slat cove filler 23 as it is deformed permits slat cove filler 23 to be utilized with a variety of different aircraft wing/slat configurations.

As slat 22 moves from the stowed configuration (FIG. 9) to the deployed configuration (FIG. 4), the deformation of slat cove filler 23 generates a force tending to cause the slat cove filler 23 to snap outwardly to the configuration of FIG. 4. Also, if a spring 44 is utilized at hinge 41, the spring 44 may also be configured to generate a force tending to bias the slat cove filler 23 to the outer position of FIG. 4. Thus, as slat 22 moves from the stowed configuration of FIG. 9 to the deployed configuration of FIG. 4, the slat cove filler 23 preferably snaps out on its own, such that an additional powered actuator or the like is not required to change from shape S1 to shape S2 and/or vice-versa. Accordingly, the slat cove filler 23 can be retrofitted to existing slat and wing designs, without the use of additional actuators or the like. If slat cove filler 23 is configured to shift from shape S2 to shape S1 without the use of auxiliary powered actuators acting on slat cover filler 23, slat cove filler 23 has a monostable configuration. If slat cove filler 23 has a monostable design, it is only stable when it is in shape S1, and slat cover filler 23 changes automatically from shape S2 to shape S1 upon deployment of slat 22. Slat cove filler 23 may also have a bistable configuration whereby slat cove filler 23 stays in both shapes S1 and S2 if no force is applied to slat cove filler 23. If slat cove filler 23 has a bistable configuration, an auxiliary powered actuator (not shown) may be required to shift from shape S1 to shape S2 and vice-versa.

Figure 10:
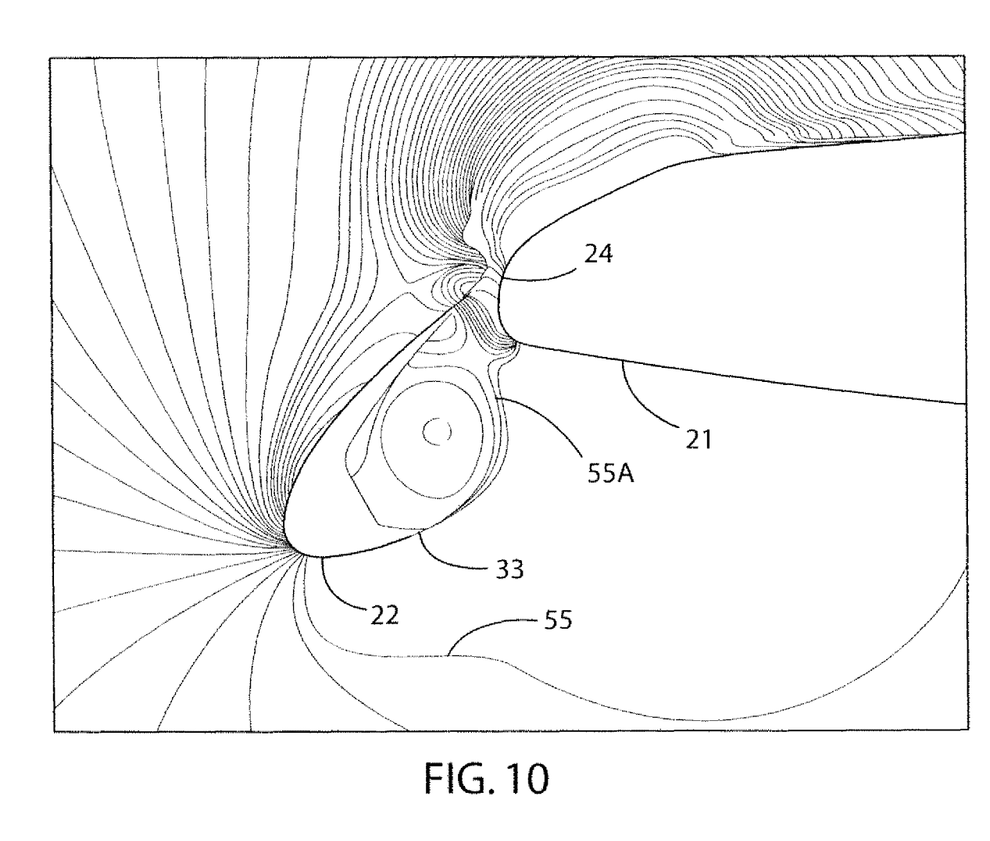
FIG. 10 is a cross-sectional view showing a leading edge slat in a deployed configuration with constant pressure lines as determined by a computer program, wherein the leading edge slat and wing structure do not include a slat cove filler.
Figure 11:
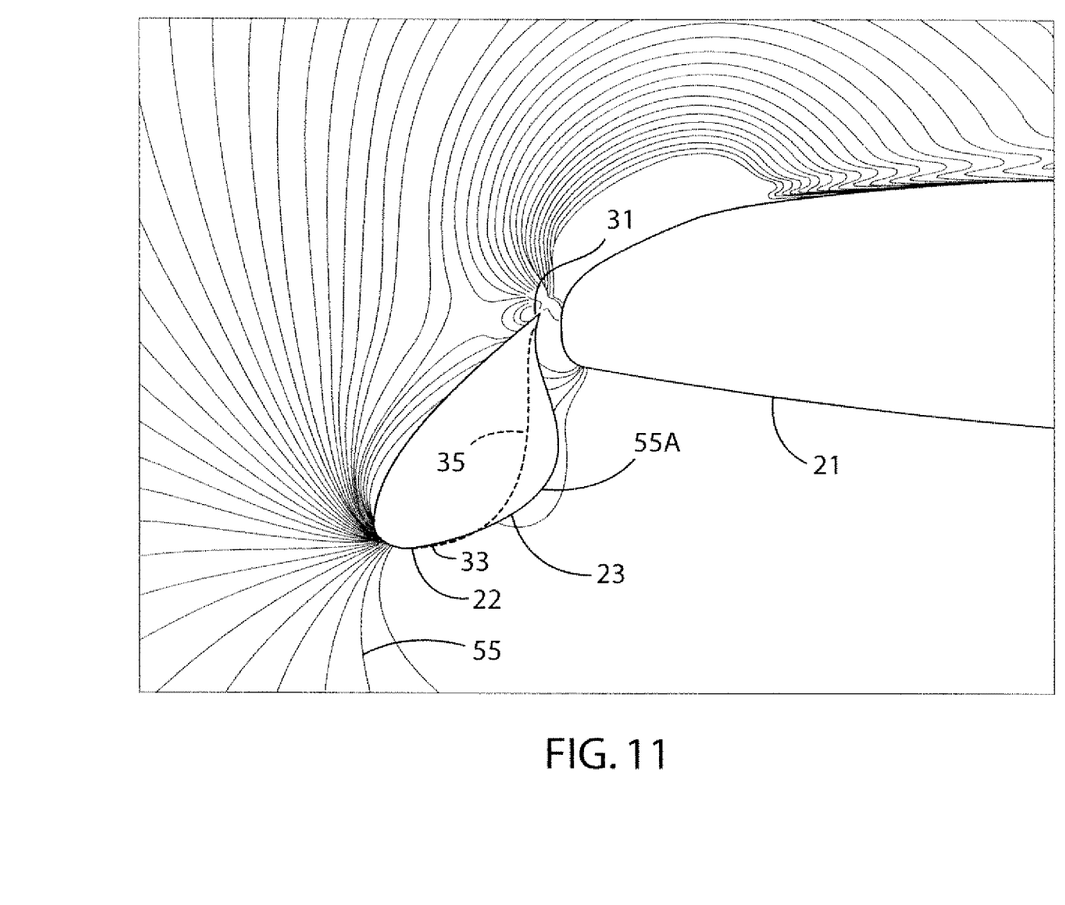
FIG. 11 is a cross-sectional view showing a leading edge slat in a deployed configuration with constant pressure lines as determined by a computer program, wherein the leading edge slat and wing structure include a slat cove filler according to one aspect of the present invention.

With reference to FIG. 10, when a slat 22 is in a deployed configuration (without a slat cove filler 23), the airflow forms a plurality of isobars or constant pressure lines 55 around the slat 22 and primary wing structure 21. The slat cove filler 23 (FIG. 11) preferably has a contour that is about the same or equal to an isobar line 55A extending from cusp 33 and then fairs smoothly into the trailing edge 31 of the slat 22 in such a way that the flow continuously accelerates in the gap or channel between the slat cove filler 23 and the wing leading edge 24, when the slat cove filler 23 is in the configuration shown in FIG. 11. With a slat cove filler 23 contour designed in this manner, the boundary layer on the slat cove filler surface will remain "attached", and not "separate", a condition which leads to degraded aerodynamic and noise-reduction performance. However, it will be understood that the contour of isobar line 55A may be different from the contour shown in FIG. 10 due to the presence of slat cove filler 23 (FIG. 11). Thus, the shape/contour of slat cove filler 23 is somewhat dependent on the flow produced by the shape of slat cove filler 23 itself. A computational fluid dynamics program can be utilized to iteratively design the contour of slat cove filler 23, according to the design philosophy discussed above. Wind tunnel testing and/or testing on an actual aircraft may also be utilized to determine the optimum contour of slat cove filler 23. As discussed above, the contour of slat cove filler 23 is preferably outside of a streamline contour 35. The use of an "attached-flow" contour for slat cove filler 23 provides for superior noise reduction relative to a slat cove filler contour following a flow line 35.

Figure 12:
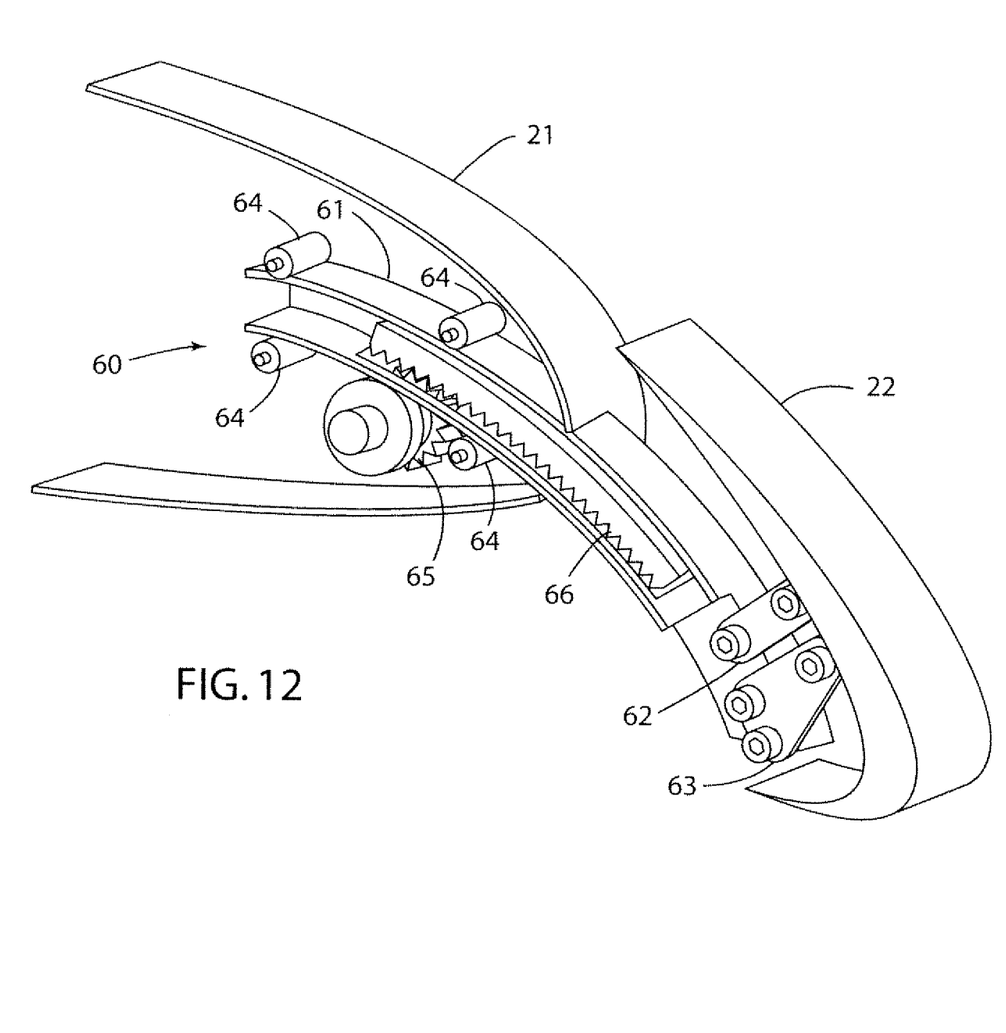
FIG. 12 is a partially fragmentary isometric view of a portion of a leading edge slat, wing structure, and mechanism for deployment of the leading edge slat.

With further reference to FIG. 12, a mechanism 60 may be utilized to move slat 22 between the deployed configuration (FIG. 4) and the stowed configuration (FIG. 9). In the illustrated example, mechanism 60 includes a channel member 61 mounted to slat 22 by brackets 62 and 63. The channel 61 is curved to provide the proper motion for slat 22 relative to primary wing structure 21. The channel 61 is movably guided by rollers 64 which are mounted to primary wing structure 21. A powered actuator such as an electric motor (not shown) is operably connected to a gear 65 which engages a curved rack 66 to thereby drive the channel 61 and slat 22 between the extended and retracted positions. The mechanism 60 of FIG. 12 may be utilized in connection with a superelastic shape memory alloy slat cove filler 23. It will be understood that a variety of mechanisms may be utilized for movement of slat 22 relative to primary wing structure 21. Mechanism 60 may comprise a known design utilized for this purpose.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A wing structure for aircraft, comprising:
    a primary wing structure defining a leading edge, a trailing edge, and upper and lower surfaces extending between the leading and trailing edges to define a first airfoil element;
    a leading-edge slat movably interconnected with the primary wing structure for movement between a retracted position wherein the leading edge slat is positioned adjacent the leading edge of the primary wing structure to reduce aerodynamic drag, and a deployed position wherein the leading-edge slat is shifted relative to the retracted position to thereby provide a multi-element airfoil, and wherein the leading-edge slat includes a leading surface whereby, in use, airflow splits and flows over an upper surface of the leading-edge slat that extends rearwardly from the leading surface to a trailing edge, and a lower surface extending rearwardly from the leading surface to a cusp;
    a slat cove filler comprising a flexible material connected to the slat near the trailing edge and near the cusp, wherein
    the slat cove filler defines a first shape when the leading edge slat is in its deployed position, and a second shape when the leading edge slat is in its retracted position, and wherein the second shape of the slat cove filler comprises a first and a second concave portion and a convex portion, wherein said first and second concave portions face the leading edge of the primary wing structure, and wherein the convex portion is disposed between the first and second concave portions,
    at least a portion of the slat cove filler comprises a superelastic shape memory alloy wherein various portions thereof transform from an austenitic phase to a martensite phase when the slat cove filler changes from the first shape to the second shape, and
    the first shape has a contoured portion existing outside a streamline that follows a shear layer bounding a recirculation region in the slat cove during flight conditions if the slat cove filler were not in place.

2. The wing structure of claim 1, wherein:
    at least a portion of the superelastic shape memory alloy transforms from a martensite phase to an austenitic phase when the slat cove filler changes from the second shape to the first shape.

3. The wing structure of claim 2, wherein:
   a portion of the slat cove filler in the first shape follows a contour of an isobar line existing in the flow field of the deployed slat at nominal approach and landing conditions if the slat cove filler were not in place.

4. The wing structure of claim 3, wherein:
   the contact of the slat cove filler with the primary wing structure causes the slat cove filler to change from the first shape to the second shape.

5. The wing structure of claim 4, wherein:
   upon entering the retracted position, internal stresses develop in the slat cove filler tending to bias the slat cove filler to change from the second shape to the first shape, and wherein the internal stresses cause the slat cove filler to change from the second shape to the first shape as the leading-edge slat is moved from the retracted position to the deployed position.

6. The wing structure of claim 3, wherein the isobar line comprises a constant pressure line that occurs during landing approach of the aircraft.

7. The wing structure of claim 1, wherein:
   at least a portion of the superelastic shape memory alloy experiences at least about 2% strain during changing from the first shape to the second shape, including when the leading edge slat is in its retracted position.

8. The wing structure of claim 1, wherein:
   the first shape of the slat cove filler defines an outer surface having a contour such that the air flow continuously accelerates in a gap between the slat cove filler and the leading edge of the primary wing structure and the air flow in that region is rendered largely steady, thereby reducing noise.

9. The wing structure of claim 8, wherein:
   the first shape of the slat cove filler includes a smoothly curved convex portion extending rearwardly from the cusp of the slat, and a concave curved portion adjacent the trailing edge of the slat.

10. The wing structure of claim 1, wherein:
    the slat cove filler has a uniformly thick configuration.

11. The wing structure of claim 1, wherein:
    the slat cove filler is connected near the cusp of the slat by a hinge.

12. The wing structure of claim 11, wherein:
    the slat includes a lower surface that intersects the upper surface along the trailing edge; and
    the slat cove filler is rigidly connected to the lower surface of the slat near the trailing edge.

13. The wing structure of claim 11, wherein the slat cove filler defines a first area having a first thickness, and a second area having a second thickness that is greater than the first thickness.

14. The wing structure of claim 11, wherein:
    the slat cove filler includes a first sheet comprising superelastic shape memory alloy having a first thickness and a second sheet of material disposed on a portion of a first sheet to define a second area having a second thickness.

15. An autonomous slat-cove-filler device for reduction of aeroacoustic noise associated with aircraft systems comprising:
    a primary wing structure defining a leading edge, a trailing edge, and upper and lower surfaces extending between the leading and trailing edges to define a first airfoil element;
    a leading-edge slat movably interconnected with the primary wing structure for movement between a retracted position wherein the leading edge slat is positioned adjacent the leading edge of the primary wing structure to reduce aerodynamic drag, and a deployed position wherein the leading-edge slat is shifted relative to the retracted position to thereby provide a multi-element airfoil, and wherein the leading-edge slat includes a leading surface whereby, in use, airflow splits and flows over an upper surface of the leading-edge slat that extends rearwardly from the leading surface to a trailing edge, and a lower surface extending rearwardly from the leading surface to a cusp;
    a slat cove filler comprising a flexible material connected to the slat near the trailing edge and near the cusp, wherein
    the slat cove filler defines a first shape when the leading edge slat is in its deployed position, and a second shape when the leading edge slat is in its retracted position, and wherein the second shape of the slat cove filler comprises a first and a second concave portion and a convex portion, wherein said first and second concave portions face the leading edge of the primary wing structure, and wherein the convex portion is disposed between the first and second concave portions,
    the slat cove filler requires no auxiliary components to the wing structure to change from the first shape to the second shape or to change from the second shape to the first shape, autonomous changes between the first shape and second shape only depend upon the movement of the slat forcing the slat cove filler to either contact the main wing and the slat cove or depart from the main wing and the slat cove, and,
    at least a portion of the slat cove filler comprises a superelastic shape memory alloy wherein various portions thereof transform from an austenitic phase to a martensite phase when the slat cove filler changes from the first shape to the second shape, wherein at least a portion of the superelastic shape memory alloy transforms from a martensite phase to an austenitic phase when the slat cove filler changes from the second shape to the first shape.

16. The device of claim 15, wherein:
    the first shape of the slat cove filler defines an outer surface having a contour such that the air flow continuously accelerates in a gap between the slat cove filler and the leading edge of the primary wing structure and the air flow in that region is rendered largely steady, thereby reducing noise.

17. The device of claim 16, wherein:
    at least a portion of the superelastic shape memory alloy experiences at least about 2% strain during changing from the first shape to the second shape, including when the leading edge slat is in its retracted position.

18. The device of claim 15, wherein:
    the slat includes a lower surface that intersects the upper surface along the trailing edge; and
    the slat cove filler is rigidly connected to the lower surface of the slat near the trailing edge.

* * * * *